(12) United States Patent
Feng et al.

(10) Patent No.: US 8,815,193 B1
(45) Date of Patent: Aug. 26, 2014

(54) SELECTIVE NON-CATALYTIC REDUCTION FOR $NO_x$ REMOVAL

(71) Applicant: Southwest Research Institute, San Antonio, TX (US)

(72) Inventors: Maoqi Feng, San Antonio, TX (US); Rijing Zhan, San Antonio, TX (US); Jeffrey N. Harris, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/872,662

(22) Filed: Apr. 29, 2013

(51) Int. Cl.
*B01D 53/56* (2006.01)
*B01D 53/74* (2006.01)
*F01N 3/24* (2006.01)

(52) U.S. Cl.
CPC . *B01D 53/56* (2013.01); *F01N 3/24* (2013.01)
USPC ........... 423/235; 422/168; 422/177; 422/180; 422/181

(58) Field of Classification Search
USPC ................... 423/235; 422/168, 177, 180, 181
See application file for complete search history.

(56) References Cited

U.S. PATENT DOCUMENTS

| 3,900,554 | A | | 8/1975 | Lyon | |
|---|---|---|---|---|---|
| 4,693,874 | A | * | 9/1987 | Hurst | 423/235 |
| 5,342,592 | A | * | 8/1994 | Peter-Hoblyn et al. | 423/235 |
| 5,547,650 | A | * | 8/1996 | Edgar et al. | 423/235 |
| 8,114,359 | B2 | * | 2/2012 | Maryamchik et al. | 422/310 |
| 8,501,131 | B2 | * | 8/2013 | Moyeda et al. | 423/235 |
| 2002/0025285 | A1 | * | 2/2002 | Comparato et al. | 423/235 |
| 2009/0252665 | A1 | | 10/2009 | Downs et al. | |
| 2011/0172090 | A1 | | 7/2011 | DiFrancesco et al. | |

FOREIGN PATENT DOCUMENTS

| CN | 202962265 U | * | 6/2013 | B01D 53/83 |
|---|---|---|---|---|
| CN | 202983543 U | * | 6/2013 | B01F 5/06 |
| WO | 2012161876 A1 | | 11/2012 | |

OTHER PUBLICATIONS

S.W. Bae, et al; "NO Removal by Reducing Agents and Additives in the Selective Non-catalytic Reduction (SNCR) Process"; Elsevier, Chemosphere 65 (2006) pp. 170175.
S.M. Banna, et al; "Mixing and Reaction of NH3 With NO in Combustion Products"; Elsevier, Combustion and Flame 42 (1981) pp. 173-181.
J.A. Caton, et al, "The Selective Non-Catalytic Reduction of Nitric Oxide Using Ammonia at Up to 15% Oxygen", The Canadian Journal of Chemical Engineering, vol. 73 (1995) pp. 345-350.
J.R. Comparato, "NOx Control Technologies: Focus SNCR", Western Coal Council, Burning PRB Coal Seminar, Apr. 24-26, 2001, Birmingham, Alabama, 5 pgs.

(Continued)

*Primary Examiner* — Timothy Vanoy
(74) *Attorney, Agent, or Firm* — Grossman, Tucker et al.

(57) ABSTRACT

A selective non-catalytic reduction apparatus for exhaust gases comprising a reactor for elevated temperature reduction of NOx comprising an injection zone, internal structure zone and rear zone. The internal structure zone includes packing materials and provides a surface area of 5.0 $m^2$/g to 20 $m^2$/g where the packing material is present in the reactor at a level of 10% to 50% of the reactor volume. The reactor provides one or more of the following: (1) a residence time for exhaust gas of 0.1 seconds to 5.0 seconds; (2) a pressure drop of less than or equal to 1400 Pa/m at an exhaust gas velocity of 1.0 meter/second.

15 Claims, 3 Drawing Sheets

(56) References Cited

OTHER PUBLICATIONS

Z.C. Feng, et al, "Raman Scattering Studies of Chemical-vapor-deposited Cubic SiC Films of (100) Si"; Journal of Applied Physics, 64 (6), (Sep. 15, 1988) pp. 3176-3186.

R. M. Ferrizz, et al, "Monolithic Supports with Unique Geometries and Enhanced Mass Transfer", Ind. Eng. Chem. Res. 44 (2005) pp. 302-308.

L.K. Frevel, et al, "Characterization of SiC Whiskers"; Journal of Material Science, 30 (1995) pp. 3734-3745.

R.M.A. Iron, et al, in: Proceedings of the Joint EPA/EPRI Symposium on Stationary Combustion NOx Control, "Tailorng Ammonia-Based SNCR for Installation on Power Station Boilers"; Section 5A, Springfield, VA, (1991), vol. 2, pp. 99-118.

M.T. Javed, et al, "Control of Combustion-generated Nitrogen Oxides by Selective Non-Catalytic Reduction"; Elsevier Ltd., Journal of Environ. Eng. 83 (2007) 251; doi:10.1016/j.jenvman.2006.03.006.

M. Kang, et al, "Low-Temperature NO Removal by Addition of NH3 Between Oxidation and Reduction Catalysts", Journal of Ind. Eng. Chem. vol. 12, No. 2 ( 2006) 224-228.

A. Kennedy; "Porous Metals and Metal Foams Made From Powders"; Powder Metallurgy; ISBN 978-953-51-0071-3; InTech, published online Mar. 9, 2012; http.//www.intechopen.com/books/powder-metallurgy/the-manufacture-of-porous-and-cellular-metals-by-powder-metallurgy-processes.

Black & Veatch, Power Plant Engineering, ISBN 0-412-06401-4 (alk. paper)Springer, 1996, (Chpt. 14: L. Lavely, et al, "Power Plant Atmospheric Emissions Control", pp. 436.

D.-W Lee, et al, "Selective Catalytic Reduction (SCR) of Lean NOx Using Propylene by Plasma Enhanced Catalysis Over Nano-Sized Gold Catalyst Supported on Alumina"; Journal Ind. Eng. Chem., vol. 9, No. 1 (2003) 102-109.

G.-W. Lee, et al, The Influence of Mixing Between NH3 and NO for a De-NOx Reaction in the SNCR Process, Journal of Industrial and Engineering Chemistry 14 (2008) 457-467.

P. Lodder, et al, Short Communication "Effect of Natural Gas, C2H6 and CO on the Homogeneous Gas Phase Reduction of NOx by NH3", The Chemical Engineering Journal, 30 (1985) 161-167.

J.A. Miller, et al, "Mechanism and Modeling of Nitrogen Chemistry in Combustion", Prog. Energy Combust. Sci., vol. 15 (1989) 287-338.

L.J. Muzio, et al: "Gas Phase Decomposition of Nitric Oxide in Combustion Products", Proceedings of the 16th Symp. (Intern.) on Combust, The combustion Institute, Pittsburgh, USA, (1976), p. 199-208.

E. B. Nauman, et al, "Static Mixers to Promote Axial Mixing"Institution of Engineers, Trans E, vol. 80, Part A, Sep. 2002, 681-685.

M. Ostberg, et al"Influence of Mixing on the SNCR Process", Chemical Engineering Science, vol. 52, No. 15 (1997) 2511..-2525.

R.A. Perry, et al, "Rapid Reduction of Nitrogen Oxides in Exhaust Gas Streams"; Nature vol. 324, No. 18, (1986) 657-658.

C. Pham-Huu, et al, "High Surface Area Silicon Carbide Doped with Zirconium for Use as Catalyst Support. Preparation, Characterization and Catalytic Application", Elsevier, Journal Applied Catalysis A, General 180 (1999) 385-397.

K.J. Rogers, et al, "Perspectives on Ammonia Injection and Gaseous Static Mixing in SCR Retrofit Applications", EPRI-DOE-EPA Combined Utility Air Pollutant Control Symposium, Report No. BR-1680, Aug. 16-20, 1999, Atlanta, Georgia, U.S.A., 5 pgs.

D. Wenli, et al, "Widening the Temperature Range of the Thermal DeNOx Process, An Experimental Investigation." Twenty-Third Symposium (International) on Combustion; The Combustion Institute: Pittsburgh, PA, 1990a; pp. 297-303.

* cited by examiner

SELECTIVE NON-CATALYTIC REDUCTION FOR $NO_x$ REMOVAL

FIELD OF INVENTION

The present invention relates to the use of selective non-catalytic reduction (SNCR) for NOx removal from exhaust gases. The SNCR apparatus and process may be improved by increased mixing between the exhaust gases and reductant which may be facilitated by an increase in the surface area of the SNCR apparatus via the use of structured packing materials.

BACKGROUND

Nitric oxides ($NO_x$), mainly including nitric oxide (NO) and nitrogen dioxide ($NO_2$), are some of the most toxic pollutants formed during combustion processes. $NO_x$ are precursors of both acid precipitation and ozone formation, and play important roles in the environment through acidification, forest damage, smog formation, damage to human health, depletion of the stratospheric ozone layer, and the greenhouse effect. Most $NO_x$ emissions come from automobiles, industrial boilers, refineries, and waste incineration plants, etc. Environmental protection and stringent emission limits both require a significant reduction of $NO_x$ emissions from stationary combustors.

Various technological approaches have been applied to $NO_x$ reduction from stationary sources. The two major categories of $NO_x$ control for stationary applications are precombustion control and post-combustion control. Precombustion control technologies include low $NO_x$ burner, overfire air (OFA) systems, exhaust gas recirculation (EGR), and more precisely controlled combustion parameters. Post-combustion treatments include aftertreatment technologies, such as selective catalytic reduction (SCR), selective noncatalytic reduction (SNCR), reburning, and the combination of these aftertreatment technologies. Among the post-combustion technologies, SNCR technology is considered to be an effective approach to reduce $NO_x$, with reasonable capital investment and operation cost.

Since SNCR does not require a catalyst, it was developed with the purpose of solving the problems inherent with SCR technology, namely, high cost, high maintenance, and sensitivity to impurities in flue gas. Recent development shows that SNCR is a viable alternative to SCR technology. Also, SNCR systems have proven very effective on circulating fluidized bed (CFB) applications where the presence of the hot cyclone ensures adequate retention time at temperatures nearly ideal for NOx reduction.

To reduce $NO_x$ in a lean (excess $O_2$) environment, a reductant is needed with an acceptable selectivity (not to be oxidized by $O_2$). For SNCR, the most effective reductant up to now is ammonia ($NH_3$). Urea [$CO(NH_2)_2$] distributed as a fine aerosol in water solution can be an alternative to $NH_3$, as it readily decomposes into $CO_2$ and $NH_3$. The applicable reactions are as follows:

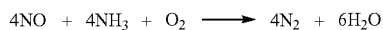

The typical operating temperature for SNCR is in the range of 850° to 1,100° C. If the temperature is over 1,100° C., $NH_3$ may be oxidized to NO. On the other hand, if the temperature is below 850° C., the reaction rate between $NH_3$ and NO is relatively too slow to be applied to $NO_x$ reduction from stationary flue gases.

Current SNCR efficiency is generally between 30-60%, depending upon the particular SNCR reactor design, which is much lower than that of SCR. Accordingly, a need exist to improve on the methods and apparatus that are employed for SNCR in order to provide a SNCR system that results in more efficient NOx removal.

SUMMARY OF THE INVENTION

A selective non-catalytic reduction apparatus for exhaust gases comprising a reactor for elevated temperature reduction of NOx comprising an injection zone, internal structure zone and rear zone, defining a reactor volume, wherein said reactor has a length of 0.50 meters to 10.0 meters and a diameter of 5.0 cm to 50.0 cm. The internal structure zone includes packing material providing a surface area of 5.0 $m^2/g$ to 20 $m^2/g$ wherein the packing materials are present in the reactor at a level of 10% to 50% of the reactor volume. The reactor provides one or more of the following: (1) a residence time for exhaust gas of 0.1 seconds to 5.0 seconds; or (2) a pressure drop of less than or equal to 1400 Pa/m at an exhaust gas velocity of 1.0 meter/second.

In method form the present invention comprises providing a reactor for elevated temperature reduction of NOx comprising an injection zone, internal structure zone and rear zone, defining a reactor volume, wherein the reactor has a length of 0.50 meters to 10.0 meters and a diameter of 5.0 cm to 50.0 cm. The internal structure zone includes packing material providing a surface area of 5.0 $m^2/g$ to 20 $m^2/g$ wherein the packing materials are present in the reactor at a level of 10% to 50% of said reactor volume. One may then introduce into the reactor an exhaust gas mixture comprising NOx alone or in combination with $H_2O$, $CO_2$ or CO. A reductant is introduced into the reactor wherein the reductant is introduced at either the injection zone or the internal structure zone, or simultaneously at both of these locations.

DETAILED DESCRIPTION

Figure 1:
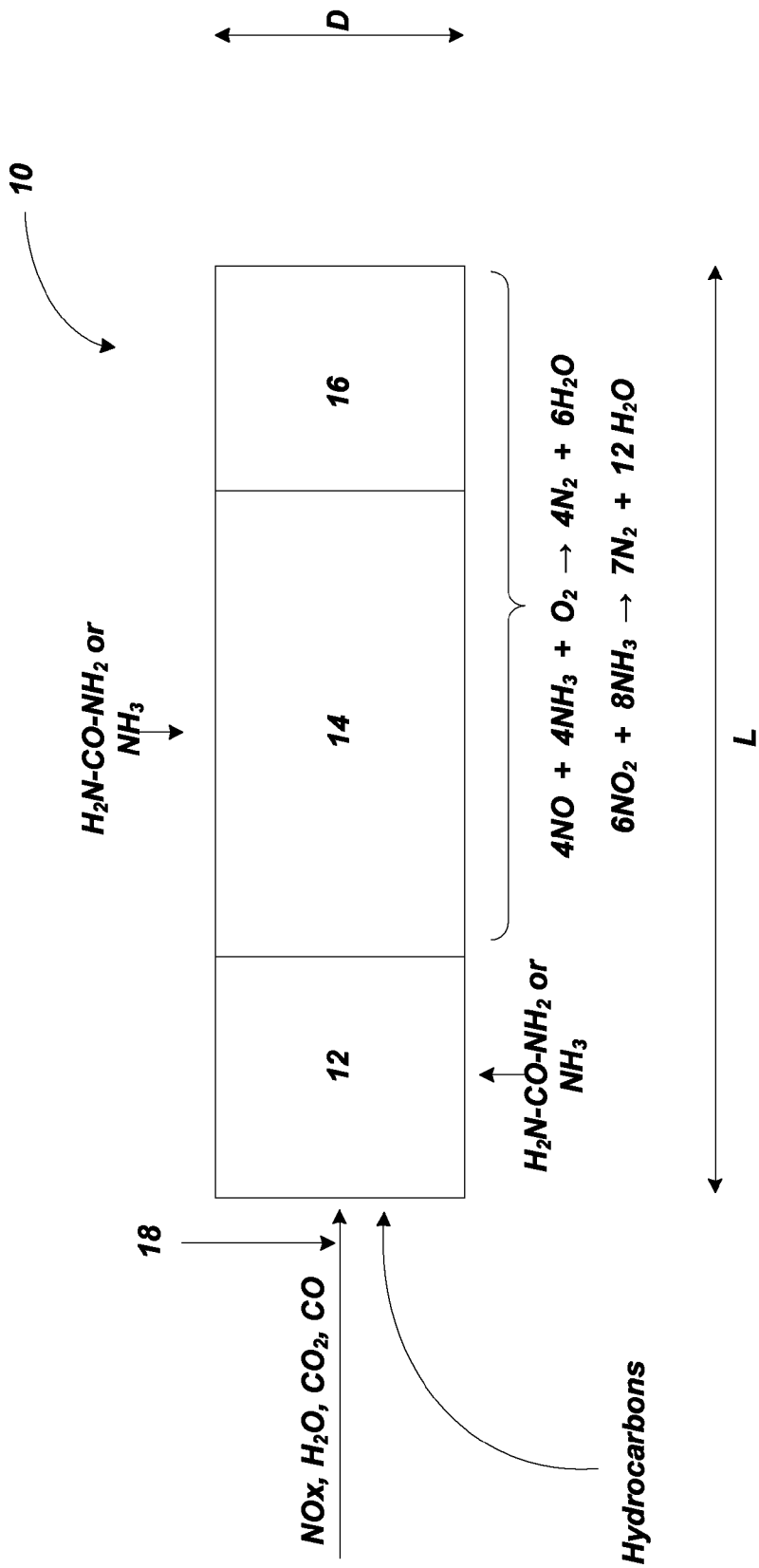
FIG. 1 is a representative drawing of a SNCR apparatus of the present invention.

Mixing between exhaust gases, such as bulk flue gas containing $NO_x$ and injected $NH_3$, is influenced by the velocity of the bulk gas, the injection velocity and the direction of the injected $NH_3$. The mixing characteristics caused by the injected $NH_3$ depends on the momentum ratio (J), as given in the equation below, where the properties with the Uj refers to the linear velocity of $NH_3$ (m/s), Uo refers to the bulk flue gas flow (crossflow in m/s). Here $\rho_j$ is the density of $NH_3$ and $p_o$ is the density of the bulk flue gas:

$$J = \left(\frac{\rho_j}{\rho_o}\right)\left(\frac{U_j^2}{U_o^2}\right)$$

Accordingly mixing is an important consideration for the efficiency of SNCR. Localized, rich $NH_3$ inject flows may pass through the reactor incompletely mixed and reacted with the flue gas ($NH_3$ slip) resulting in increased $NO_x$ breakthrough. In the equation above, the momentum ratio J decreases with the bulk flue gas velocity, and the optimum J was found to be about 100. We can use this number to adjust the $NH_3$ injection flow rate if given a certain flue gas velocity.

SNCR can achieve higher reduction rates if the reductant reagent is well mixed with the flue gas. In order to avoid slipping and achieve relatively high reduction rates, good mixing of the reagent (for example $NH_3$) with the flue gas is desirable. Preferably, the mixing should occur in a relatively short distance as the volume in the SNCR apparatus is generally restricted. Any additional components added to the SNCR apparatus should be such that they provide a relatively low pressure drop.

SNCR systems may be now be modified to incorporate internal structure into the SNCR apparatus. Reference here to internal structure may be understood as incorporation of relatively high-temperature packing material that operates to improve mixing, flow distribution as well as temperature distribution within the SNCR. The packing materials therefore are such that they are solid and resistant to degradation at reactor temperatures of 700° C. to 1200° C. The packing materials are also preferably such that they provide a surface area of 5.0-20.0 $m^2/g$ within the reactor. In addition, the packing materials when in foam form preferably will provide 5-45 pores per inch and a bulk density of 0.20 $g/cm^3$ to 0.30 $g/cm^3$. The packing materials also are preferably present in the SNCR reactor at a level between 10% to 50% of the SNCR reactor volume.

In addition, the packing materials are preferably selected and positioned in the SNCR reactor to provide one or more of the following: (1) the $NH_3/NO_x$ ratio (ANR) is maintained relative to the same reactor without packing; (2) the $NH_3$ slip level is controlled to be at or less than 5.0 ppm; (3) the residence time of the exhaust gas in the SNCR reactor is in the range of 0.1-5.0 seconds; (4) the pressure drop is less than or equal to 1400 Pa/m at a gas velocity of 1.0 meter/second.

The internal structures herein to be employed in the SNCR reactor may be sourced from structured packing materials, which may be understood as materials that are arranged or stacked in a selected manner to provide a desired filling of the reactor. These may be typically formed of relatively thin corrugated metal plates that are arranged in a manner to force a fluid to take a tortuous pathway, thereby providing relatively large surface areas. Structured packing materials may also provide a honeycomb type structure with corresponding flow channels. The internal structures herein may also be sourced from random packing materials, which may be understood as materials that are randomly introduced into the reactor. In either case (structured or random packing materials) the materials themselves may be made of metal or metal alloys, ceramics, silicon, alumina, rare-earth oxides or silicon carbide.

In addition, the internal structures herein may be sourced from foam materials. For example, one may utilize porous metallic foam material which includes metals with pores integrated into their structure. These may preferably include porous metals made from sintered metal powders, silicon carbide foam and/or ceramic type foam.

Attention is directed to FIG. 1 which illustrates one example of the SNCR reactor apparatus herein. The SNCR reactor apparatus 10 includes an injection zone 12, internal structure zone 14 and rear zone 16 for the elevated temperature reduction of NOx from any exhaust gas of hydrocarbon combustion, which may therefore include flue gases. The internal structure zone, as noted above, may preferably account for 10-50% of the available apparatus volume. In addition, the reductant may be introduced into the injection zone 12 and/or at the internal structure zone 14, as illustrated.

A reductant may be understood herein as any compound that is capable of reacting with NOx (such as nitric oxide or nitrogen dioxide) and which may then reduce or eliminate their presence as a pollutant. As alluded to above, the reductant may preferably include ammonia ($NH_3$) or urea ($H_2NCONH_2$). In addition, the reductant herein may include a hydrocarbon (e.g. methane, ethane or propane) or a hydrocarbon fuel such as gasoline or diesel, as well as biofuels and/or synthetic fuels (Fisher-Tropsch fuels). Such hydrocarbons may be used alone or in combination with ammonia or urea.

More specifically, employed herein as a reductant was propane which was present at 600 ppm within a nitrogen mixture. Also employed herein as a reductant was a mixture of hydrocarbons, where the mixture comprised n-butane at 1010 ppm, ethane at 1010 ppm, n-hexane at 1010 ppm, methane at 1000 ppm, n-pentane at 1010 ppm, propane at 1000 ppm, with the balance nitrogen. In connection with the use of hydrocarbons, and employing methane as an example, the reduction of NOx may follow the following general reaction:

$$CH_4 + 2NO + O_2 \longrightarrow N_2 + CO_2 + 2H_2O$$

In addition, the presence of such additional chemical components such as hydrocarbons may provide, upon burning, additional heat and temperature to drive NOx reduction and removal.

As noted, reductant injection may take place preferably at an injection location at the midpoint of internal structure zone 14, alone or in combination with reductant injection into an injection location at the injection zone 12. The diameter "L" and length "D" of the SNCR apparatus may be 0.5 meters to 10.0 meters and 5.0 cm to 50.0 cm, respectively. Optionally, one may position an inline static mixer at 18 in front of the injection zone 12.

Figure 2:
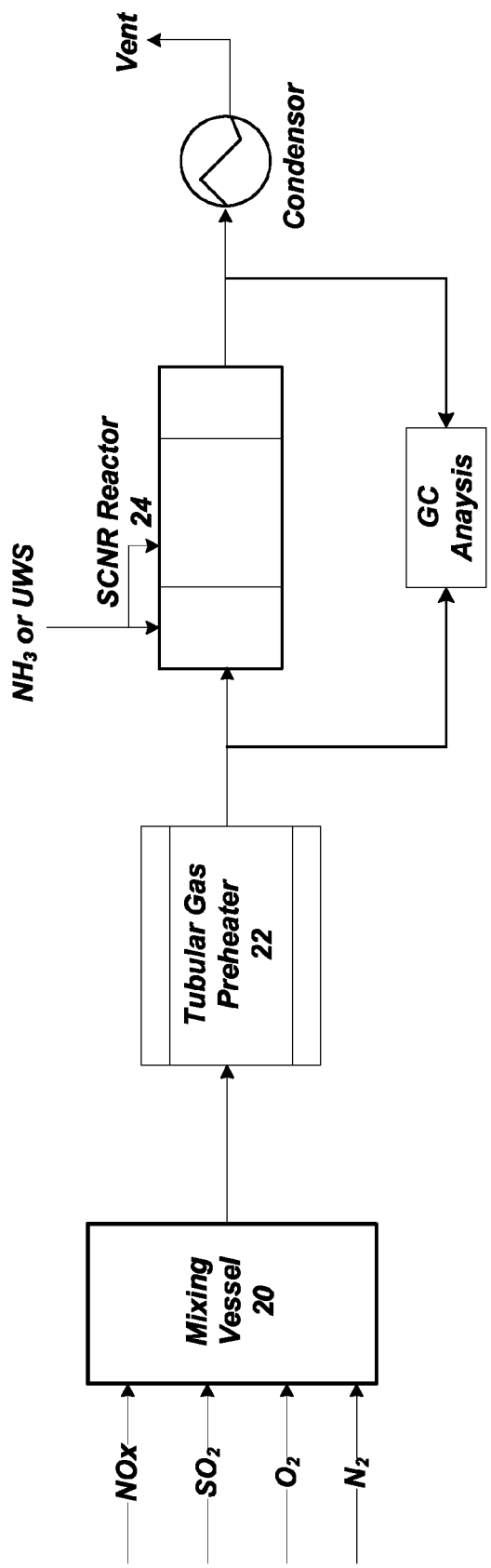
FIG. 2 is a drawing of a SNCR test system.

A SNCR test system was designed according to FIG. 2. As illustrated, the test system includes mixing vessel 20 which is connected to a tubular gas preheater 22 to heat the simulated exhaust or flue gases (NOx, $SO_2$, $O_2$, $N_2$) which serves as a feedstock for evaluation. The SNCR test reactor 24 measures about 5.0 cm in diameter and about 183 cm in length and is packed with internal structure as more fully described below. Table 1 below shows the gas concentrations of the simulated exhaust/flue gases.

TABLE 1

Gas Concentrations Of Simulated Exhaust/Flue Gases

| Gas Components | Concentrations (Volume %) |
|---|---|
| NOx (as 100% NO) | 0.06% |
| $O_2$ | 10% |
| $CO_2$ | 8% |
| $SO_2$ | 0.025% |
| $H_2O$ | 6% |
| $N_2$ | Balance |

The SNCR reactor 24 was provided with internal structure (packing noted below) to provide a pressure drop of less than 1380 Pa/m at a gas velocity of 1.0 m/second. Ammonia was used as the reductant.

Example 1

Clay Packing

Figure 3:
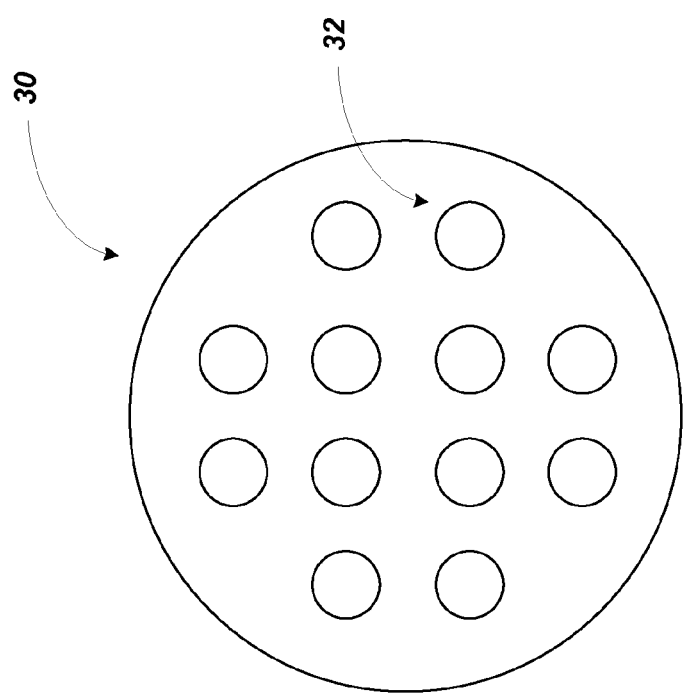
FIG. 3 is a cross-section of the internal structure of a clay cake that is positioned in the SNCR reactor.

Three internal structure packings were evaluated which were prepared from clay. The procedure was as follows: clay slurry was loaded into an extruder and clay cakes or cylinders were extruded in 1.8 inches size, then 12 holes (3/16 inch diameter) were made on each with a rod. After drying in an oven at 90° C. for 12 hours the extruded materials were then fired in a kiln at 1,000° C. overnight. The clay cakes thus produced were in 1.8 inches diameter, 0.5 inch thickness and 1.0 inch thickness, with 12 holes (3/16 inch diameter); the clay cylinder was 1.8 inches diameter, 5.5 inches length, with 12 holes (3/16 inch diameter). FIG. 3 illustrates a cross-section of the internal structure of a clay cake 30 including holes 32 which cake operates to increase available surface area in the SNCR reactor. Ten sections of the 0.5 inch thick clay cakes were positioned in the SNCR test system illustrated in FIG. 2 and the pressure drop was measured to be 348.9 Pa/m at a gas flow of 1.0 m/second. During the test, the ten sections were placed in the reactor with holes lined up in the same direction.

Table 2 below lists the results of the percentage of NOx removal for the tests at different conditions, including: (1) control or "no packing"; (2) 4 sections of 0.5 inch thick clay; (3) 8 sections of 0.5 inch thick clay packing. The NOx removal percentage was observed to increase significantly when 8 sections of clay packing was used in the SNCR test system reactor (FIG. 2).

TABLE 2

Test Results For The SNCR Evaluation (280 ppm NOx, 850° C.)

| Packing Material | NH₃/NOx Ratio | NOx Removal (%) | NH₃ Slip (ppm) |
|---|---|---|---|
| N/A | 1.42 | 25.9 | <2.0 |
| 4 pieces of clay packing | 1.42 | 29.6 | <2.0 |
| 8 pieces of clay packing | 1.42 | 49.0 | <2.0 |

Table 3 below provides testing results for 4 pieces of 1.0 inch thick clay. The clay packings were again 0.5 inches in thickness and the same 12 hole design as noted above. Compared with no packing the in SNCR test system (FIG. 2), the 1.0 inch thick clay packing materials improved the NOx removal rate by 89% with 300 ppm NOx at 850° C.

TABLE 3

Analytical Results For The SNCR Evaluation With Clay Packing

| Packing Material | NOx Concentration (ppm) | NOx Removal (%) | NH₃ Slip (ppm) |
|---|---|---|---|
| N/A | 300 | 31.9 | 1.4 |
| 4 pieces of 1.0" Clay | 200 | 64.2 | 1.0 |
| 4 pieces of 1.0" Clay | 300 | 60.3 | 1.2 |
| 4 pieces of 1.0" Clay 400 | 400 | 60.5 | 1.1 |

Example 2

Silicon Carbide Foam Packing

Silicon carbide foam with 1.875" diameter, 2.0" thick, 30 pores per inch (PPI) was employed as a packing material for the SNCR test system (FIG. 2). The pressure drop for 5 pieces of the 30 PPI foam was measured to be 203.5 Pa/m at a gas velocity of 1.0 m/second.

As compared to an unpacked SNCR reactor, the NOx removal efficiency increased over 12% for two (2) pieces of silicon carbide foam at temperatures of 850° C. and 280 ppm NOx.

It is to be understood that the foregoing description and specific embodiments are merely illustrative of the present invention and the principles thereof and that various modifications and additions may be made to the present invention without departing from the scope of the invention.

The invention claimed is:

1. A selective non-catalytic reduction apparatus for exhaust gases comprising:
    a reactor for elevated temperature reduction of NOx comprising an injection zone, internal structure zone and rear zone, defining a reactor volume, wherein said reactor has a length of 0.50 meters to 10.0 meters and a diameter of 5.0 cm to 50.0 cm;
    said internal structure zone including packing material providing a surface area of 5.0 m²/g to 20 m²/g wherein said packing material is present in said reactor at a level of 10% to 50% of said reactor volume;
    wherein said reactor provides one or more of the following:
    (1) a residence time for exhaust gas of 0.1 seconds to 5.0 seconds;
    (2) a pressure drop of less than or equal to 1400 Pa/m at an exhaust gas velocity of 1.0 meter/second.

2. The selective non-catalytic reduction apparatus of claim 1 wherein said packing material comprises structured packing materials.

3. The selective non-catalytic reduction apparatus of claim 1 wherein said packing material comprises random packing materials.

4. The selective non-catalytic reduction apparatus of claim 1 wherein said packing materials comprise foam materials.

5. The selective non-catalytic reduction apparatus of claim 1 including an injection location for injection of reductant in said injection zone and in said internal structure zone.

6. The selective non-catalytic reduction apparatus of claim 1 including a static mixer positioned prior to said injection zone.

7. A method for the selective non-catalytic reduction of exhaust gases comprising:
    providing a reactor for elevated temperature reduction of NOx comprising an injection zone, internal structure zone and rear zone, defining a reactor volume, wherein said reactor has a length of 0.50 meters to 10.0 meters and a diameter of 5.0 cm to 50.0 cm;
    said internal structure zone including packing material providing a surface area of 5.0 m²/g to 20 m²/g wherein said packing materials are present in said reactor at a level of 10% to 50% of said reactor volume;
    introducing into said reactor an exhaust gas mixture comprising NOx alone or in combination with H₂O, CO₂ or CO;
    introducing a reductant into said reactor wherein said reductant is introduced at either said injection zone or said internal structure zone.

8. The method of claim 7 wherein said reductant is introduced into said reactor at said injection zone and said internal structure zone.

9. The method of claim 7 wherein a hydrocarbon is introduced to said injection zone.

10. The method of claim 7 wherein said reductant comprises ammonia or a urea water solution.

11. The method of claim 7 wherein said reactor provides one or more of the following:
  a. a residence time for exhaust gas of 0.1 seconds to 5.0 seconds;
  b. a pressure drop of less than or equal to 1400 Pa/m at an exhaust gas velocity of 1.0 meter/second.

12. The method of claim 10 wherein the ammonia slip level for said ammonia injected into said reactor is less than 5.0 ppm.

13. The method of claim 7 wherein said reductant comprises a hydrocarbon.

14. The method of claim 13 wherein said hydrocarbon comprises one of methane, ethane or propane.

15. The method of claim 13 wherein said hydrocarbon comprises a mixture of n-butane, ethane, hexane, methane, n-pentane and propane.

\* \* \* \* \*